United States Patent
Ekstrom

[11] 3,868,567
[45] Feb. 25, 1975

[54] MEASUREMENT OF ST DEPRESSION OF ELECTROCARDIOGRAMS

[75] Inventor: Philip A. Ekstrom, Seattle, Wash.

[73] Assignee: Board of Regents, University of Washington, Seattle, Wash.

[22] Filed: Nov. 26, 1973

[21] Appl. No.: 419,133

[52] U.S. Cl. ............................ 324/77 A, 128/2.06 A
[51] Int. Cl. ............................................. G01r 23/16
[58] Field of Search ............. 324/77 A; 128/2.06 A; 332/11 D

[56] References Cited
UNITED STATES PATENTS
3,267,933   8/1966   Mills .................................. 324/77 A
3,267,934   8/1966   Thornton ....................... 128/2.06 A

Primary Examiner—Michael J. Lynch
Attorney, Agent, or Firm—Klarquist, Sparkman, Campbell, Leigh, Hall & Whinston

[57] ABSTRACT

A method and apparatus for electronically determining the ST depression of an electrocardiogram waveform relative to the PQ level of the same waveform is disclosed. The analyzer and the associated method employ delta modulation and demodulation for processing information. By varying a weight signal in the delta demodulator in a predetermined manner, the average ST depression is obtained directly without the necessity of comparing a delayed version of the EKG with an undelayed version of the EKG to overlap the ST and PQ segments of interest. The method and apparatus disclosed can be used to determine the average difference between two segments of waveforms other than an electrocardiogram by adjusting the weight signal.

20 Claims, 9 Drawing Figures

MEASUREMENT OF ST DEPRESSION OF ELECTROCARDIOGRAMS

BACKGROUND OF THE INVENTION

This invention relates to electrocardiology and more particularly to a method and apparatus for measuring the amplitude depression of the ST segment relative to the earlier PQ segment of an electrocardiogram waveform.

An electrocardiogram waveform (EKG) is produced by the action of the heart muscle in a human being. This signal can be detected on the surface of the skin by appropriately located electrodes. These signals are caused by the expansions and contractions of the heart muscle and a study of these signals yields information as to the medical state of the heart.

An EKG signal includes a signal portion that results from depolarization of the ventricles prior to contraction and is referred to as the QRS complex. Immediately preceding this complex is a small positive pulse that results from the initiation of muscular activity and is referred to as the P wave. Following the QRS complex is an additional positive pulse referred to as the T wave. The present apparatus is an instrument which produces information relating to the portion of the EKG waveform between the S and T waves.

In a normal adult heart the amplitude of the ST segment relative to some reference has recognized significance as to the condition of the heart. It has been observed that excessive depression of the ST segment of the EKG waveform while a patient is undergoing moderate exercise can be predictive of coronary heart disease. The depression of the ST segment is usually with respect to the PQ segment of the same EKG. Since the ST and PQ segments of the EKG waveform occur at different times, in order to observe the differences between them, it was necessary to employ a technique whereby the PQ segment is stored so that a comparison can be made after the ST segment has occurred. A method and apparatus which employs this technique is disclosed in U.S. patent application Ser. No. 184,716 filed Sept. 20, 1971. Such an analyzer essentially subtracts the average amplitude of the PQ segment from the amplitude of the ST segment. Because of system noise generated, particularly during strenuous exercise, to obtain accurate information data must be collected over many heart beats.

Perhaps the biggest problem with ST analysis is that the only feature of the waveform prominent enough to trigger an analyzer under noisy conditions is the QRS complex. Unfortunately, the PQ segment occurs before the QRS complex.

In previous ST analyzers the above problems were overcome by use of an adjustable signal delay to store the PQ segment until after the QRS complex had triggered the analyzer. Careful selection of the signal delay brought the PQ segment into coincidence with an undelayed ST segment for generating the desired ST depression. Averaging the ST depression over several beats produced the desired information substantially free of errors due to low frequency noise in the detected EKG signal.

However, the use of a variable signal delay has disadvantages compared to the fixed signal delay of the present invention. The variable signal delay must be carefully adjusted. Further, repeated adjustments may be necessary to keep the desired segments in coincidence. Since this variable delay is also used to select the portion of the PQ and ST segments utilized in the subtractor, triggering and adjustment of the signal delay are critical.

OBJECTS OF THE INVENTION

It is accordingly an object of the invention to provide an improved ST analyzer which does not require a variable signal delay.

It is a further object of the present invention to provide an analyzer which has a fixed signal delay and in which the selection of the portion of the PQ and ST segments utilized for measurement is set independently of the signal delay.

It is another object of the present invention to provide an ST analyzer employing delta modulation for processing the signal information.

It is a further object of the present invention to provide an ST analyzer which directly produces the average ST depression without a coincidence comparison with the PQ segment.

It is yet another object of the present invention to provide a novel delta demodulator which is capable of directly producing the average difference between two signal segments without the use of a delay for overlapping the signal segments for comparison thereof.

Other objects and advantages of the present invention will be apparent from the following specification and drawings.

SUMMARY OF THE INVENTION

The present invention is a method and apparatus for processing an electrocardiogram waveform (EKG) to directly yield an averaged depression of the ST segment of an EKG relative to the PQ segment of the same EKG. The analyzer receives an EKG waveform as an input, adds a small amount of high frequency noise to improve the resolution of a modulator which delta modulates the signal. The noise is produced by a dither generator. The delta modulator receives the noisy EKG waveform and repetitively compares the instantaneous voltage level of the waveform against a voltage level stored in a staircase memory. The delta modulator then transmits a binary digit indicative of the algebraic sign of the difference of the comparison. The voltage level stored in the staircase memory is increased or decreased according to the transmitted digit. The binary bit stream thus produced is fed to a digital delay which may conveniently comprise a fixed length shift register. The bit stream is also provided to a trigger generator which produces an output when the R wave of the EKG is detected. This output operates the control and weight signal generator necessary for operation of a delta demodulator.

After passing through the digital delay the bit stream is received by a variable weight delta demodulator. The polarity of each bit is used by the demodulator to gate a variable weight signal produced by the control and weight signal generator into an accumulating memory. Depending on the polarity of each binary bit the weight signal is either added to or subtracted from the accumulating memory. The weight signal generated is varied in accordance with the discovery that a linearly increasing weight signal over the PQ segment, followed by a constant weight signal between the PQ and the ST segments and finally a linearly decreasing weight signal during the ST segment yields a voltage stored in the accumulating memory which is precisely the average value of the ST segment minus the average value PQ segment.

After each EKG waveform has been processed, an analog sampler samples and stores the output ST depression. After a period of time the sampler contains an average ST depression over several EKGs. This value is displayed or otherwise utilized.

It will be observed that the present system directly produces the ST depression without the need for overlapping a PQ and an ST segment. No delayed and undelayed representation of the EKG are utilized to obtain segment coincidence. Rather, the present system directly yields the desired data through a mathematically determined signal processing sequence which may be likened to integrating a function to obtain its area.

While the present system was developed for use in ST analysis it will be recognized that it can be used when and wherever it is desired to obtain the difference of two segments of a waveform.

DETAILED DESCRIPTION

Figure 1:
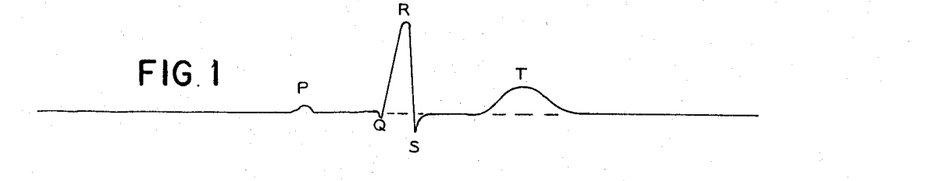
FIG. 1 is an illustration of a normal electrocardiogram waveform.

Referring to FIG. 1, a normal adult electrocardiagram waveform (EKG) is illustrated. This waveform includes, in sequence, a P wave of positive polarity, a QRS complex consisting of a negative Q wave, a large positive R wave, and a negative S wave, and finally, a T wave separated from the QRS complex. In an actual EKG waveform there are several additional waves present but they have no significance to the present invention and have been omitted for purposes of simplicity. Normal EKG signals are produced periodically at a frequency of about 60 to 80 times per minute when a person is at rest. Under strenuous exercise or other abnormal circumstances the pulse rate may rise to almost 200 beats per minute.

The P wave is normally a small positive pulse that corresponds to a body impulse triggering the heartbeat and the resulting reflexive expansion and contraction thereof. Following the P wave is a quiescent portion, the PQ segment, of substantially uniform amplitude. This quiescent PQ segment lasts for approximately 0.04 seconds. At the conclusion of this segment the QRS complex occurs. This complex precedes the ventricular contractions producing the actual pumping in the heart.

Following the QRS complex is the T wave. Between the S and T waves is a second relatively uniform segment, the ST segment. The amplitude of this segment will normally be approximately equal to the PQ segment as indicated by the dashed lines in FIG. 1. It has been discovered through medical research that under exercise testing of a human being the normal amplitude of the ST segment will change. A healthy heart will have a slight depression of the ST segment relative to the PQ segment. A depression up to approximately 100 microvolts is usually considered normal depending on other factors. Depression of the ST segment of more than this level is indicative of heart damage or other condition which requires medical attention.

Figure 2:
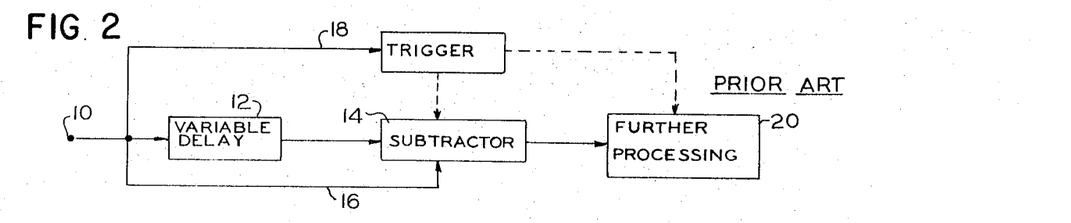
FIG. 2 is a simplified block diagram of a prior ST analyzer.

Referring now to FIG. 2, a block diagram of a prior system for obtaining the average ST segment depression is shown. An analog signal representing the EKG waveform is received from appropriate electrodes attached to the patient's body. This signal is provided as an input to the prior art circuit at terminal 10. The signal then passes through a variable signal delay 12 to a subtractor 14. An undelayed version of the signal is also provided to the subtractor via line 16 and to a trigger generator via line 18. By appropriately selecting the amount of signal delay 12, the subtractor 14 will subtract the PQ segment of the EKG signal from the ST segment to obtain the ST depression level. The resulting signal is displayed or subject to further processing as indicated by block 20.

The essential feature of this prior art circuit is the requirement of a variable signal delay allowing an EKG waveform to be effectively superimposed upon itself such that the time relationship between the waveforms places the PQ and ST segments into coincidence so that subtraction can be performed. As will be described, the present invention eliminates the need for a variable signal delay and the superposition of EKG segments. The desired ST depression is directly obtained. This has the advantage of eliminating the need for a variable signal delay and instead a fixed length time delay is employed.

SYSTEM DESCRIPTION

Figure 3:
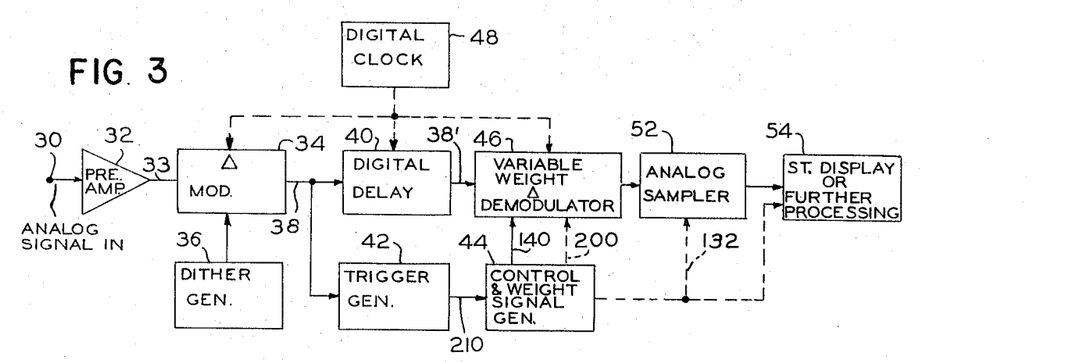
FIG. 3 is a block diagram of an ST analyzer according to the present invention.
Figure 6:
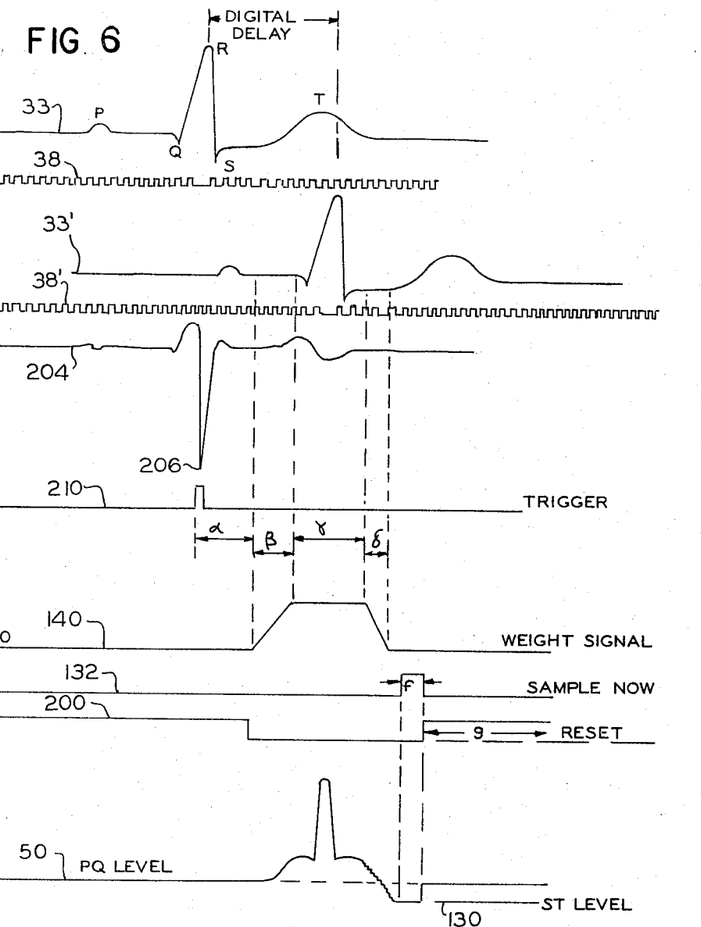
FIG. 6 are waveforms useful in explaining the operation of the ST analyzer of the present invention.

Referring to FIG. 3, a block diagram of an ST analyzer according to the present invention is shown. An analog EKG signal from a patient is received at terminal 30 and amplified by preamplifier 32. The EKG waveform 33 is shown in FIG. 6. Prior to delta modulation by modulator 34, the EKG signal is processed to impose a high frequency pseudo random noise component thereon by means of dither generator 36.

The technique of dithering an analog signal is well known in the art and will only be briefly discussed here. Dithering adds noise components to a signal at frequencies much greater than the signal frequency and above the band pass of the system. Its present purpose is to improve the quantizing characteristics of the delta modulator 34. Dithering allows the modulator to better follow the EKG signal for values of the signal which are near the quantizing boundaries of the modulator. That is, amplitude resolution is improved. The noise added by dithering is removed during the demodulation process.

The dithered analog EKG signal is not shown because it is similar to EKG signal waveform 33 except for having a wide "fuzzy" line forming such waveform due to the small amplitude high frequency noise modulation of dithering of signal 33.

The dithered analog EKG signal is then delta modulated by modulator 34 yielding a digital representation of such analog signal shown as a binary bit stream 38 in FIG. 6. The bit stream 38 is provided to a digital delay 40 and a trigger generator 42. Digital delay 40 is preferably a fixed length shift register whose output is a delayed digital signal 38' which is delayed sufficiently for the trigger generator 42 to cause a control and weight signal generator 44 to produce the necessary control waveforms for the variable weight delta demodulator 46 before the delayed bit stream 38' is applied to such demodulator. A delayed analog EKG signal 33' corresponding to the delayed digital signal 38' is shown in FIG. 6 for purposes of explanation but such delayed EKG signal 33' is not actually produced. A fixed frequency clock 48 controls the rate at which the bit stream is processed by the system. The frequency at which the digital clock 48 operates is chosen for convenience and may be about 5KHz.

The digital bit stream received by the delta demodulator 46 is utilized to gate a weight signal into the demodulator which includes an accumulating memory. The polarity of the bit stream determines the polarity of the weight signal applied to the memory. The amplitude of the weight signal is varied in a manner to be described. The output of the demodulator 46 is shown as waveform 50 in FIG. 6. This waveform contains the desired ST depression relative to the PQ segment. The balance of the waveform is of no medical significance and is ignored by appropriate gating of an analog sampler 52. Sampler 52 samples a continuous series of ST depression levels. Thus, each time it samples, the output of the sampler assumes a value which is an appropriately weighted average of its input and its previous output. Its output is the average ST depression and can be provided to a front panel display or further processing as indicated by block 54.

DELTA MODULATOR

Figure 4:
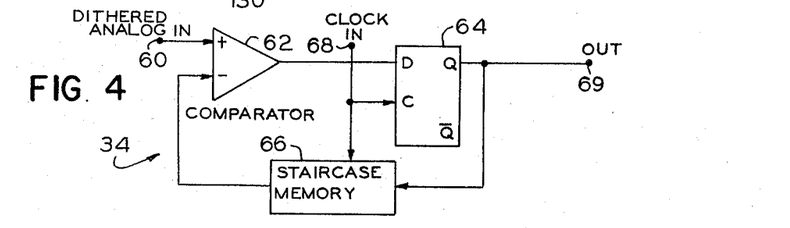
FIG. 4 is a schematic diagram of a delta modulator according to the present invention.

Referring now to FIG. 4, the delta modulator according to the present invention is shown. Delta modulation is a term of art used by many authors interchangeably with predictive quantizing or differential pulse code modulation (DPCM). In a delta modulator the difference between the present signal and some estimate of the signal based on its past is determined. Many variations of delta modulators are known in the art, for example U.S. Pat. No. 2,605,361 to Cutler discloses a delta modulator utilizing integrators to perform the predicting function.

The present delta modulator receives the dithered EKG waveform corresponding to waveform 33 as an input on terminal 60. Terminal 60 is the positive input of comparator 62 whose output is connected to the D input of D-type flip-flop 64. The Q output of flip-flop 64 is the modulator output and is also fed to a staircase memory 66. The output of the staircase memory 66 is connected to the negative input of comparator 62 and provides the reference level against which the input signal is compared. Both the flip-flop 64 and the staircase memory 66 operate at the system clock frequency supplied via terminal 68.

DELTA MODULATOR OPERATION

Considering the operation of the modulator, at each clock pulse, comparator 62 compares a portion of the dithered analog waveform similar to EKG signal 33 against the voltage level stored in staircase memory 66. If the instantaneous amplitude of the dithered EKG waveform is greater than the voltage level in the memory, the comparator produces a positive output effective to produce a high Q output from flip-flop 64. The high Q output is fed via terminal 69 to digital delay 40 and trigger generator 42 as previously explained. The high Q output is also fed to the staircase memory 66 which will increase its stored voltage level by one increment each time a high Q signal is received.

Should the comparator 62 receive an analog signal which is less than the voltage level stored in the staircase memory 66, a negative output is produced. D-type flip-flop 64 will go or remain low. A low Q signal to the staircase memory 66 causes it to decrease its stored voltage level by one increment. Referring to FIG. 6, waveform 38, it will be apparent that each time the Q output is high a positive pulse is produced. Each time the Q output is low a negative (or zero) pulse is produced. The output of the delta modulator is a binary bit stream of ones and zeros wherein a one represents a plus and a zero represents a minus.

Delta modulator 34 thus represents the EKG waveform 33 as a sequence of discrete steps either up or down. The condition of no step is not allowed. A constant voltage level would be represented by an alternating sequence of up and down steps. The performance of the modulator depends on the step size, i.e., amplitude of the steps, and on step rate, i.e., clock frequency. The step size is chosen small enough to minimize jitter and graininess in the output and the step rate is chosen fast enough to follow signal excursions of interest.

Mathematically, the delta modulated representation of the difference of a waveform over a segment ab is:

$$V_b - V_a = \Delta \sum_{k=a+1}^{b} e_k \qquad (1)$$

Where
$V_b$ = Waveform amplitude at point b
$V_a$ = Waveform amplitude at point a
delta = Modulating step amplitude
$e_k = \pm 1$ for an up step or down step respectively

VARIABLE WEIGHT DELTA DEMODULATOR

Figure 5:
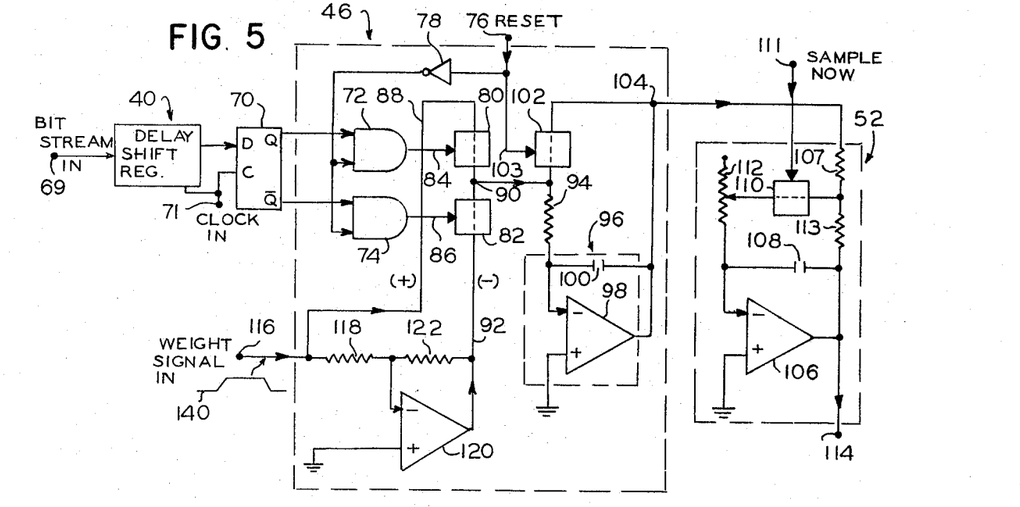
FIG. 5 is a schematic diagram of the digital delay, delta demodulator with variable weight input and the sampling circuit according to the present invention.

Referring now to FIG. 5, the digital delay 40, delta demodulator 46 and analog sampler 52 are disclosed in schematic form. The digital delay 40 is preferably a shift register the last stage of which is connected to a D type flip-flop 70. The shift register and the flip-flop 70 receive the system clock on terminal 71. The shift register constitutes a fixed digital delay and may be of any desired length, the only criterion being that it must be sufficient so that the necessary control waveforms reach the demodulator prior to the PQ segment of the bit stream. When the bit stream reaches the flip-flop 70 a 1 bit produces a high Q output. If the bit is a zero the Q̄ output automatically goes high in a D type flip-flop.

The delta demodulator 46 receives the output of flip-flop 70 via a pair of AND gates 72 and 74. If Q is high AND gate 72 receives the output; if Q̄ is high AND gate 74 receives the output. The other inputs of AND gates 72 and 74 are connected to a reset terminal 76 via an inverting amplifier 78. It will be apparent that when the reset signal on terminal 76 is high a low signal will disable the AND gates preventing an output from either. Conversely, when the reset signal on terminal 76 is low there is a high output at both of the AND gates 72 and 74, so that one will be actuated by each binary bit.

Connected to the outputs of AND gates 72 and 74 are the control gates 84 and 86 of bilateral switches 80 and 82 respectively. Bilateral switches 80 and 82 are integrated circuit components commercially available, as for example, RCA type CD 4016–A. A bilateral switch may be considered analogous to a relay in that when its control gate receives a high signal, a circuit is completed between two inputs as indicated, for example, by the dashed lines in switch 80. Thus, switch 80 connects line 88 to terminal 90 whenever control gate 84 receives a high output from AND gate 72.

Terminal 90 is connected via resistor 94 to an accumulating memory 96. The accumulating memory comprises an operational amplifier 98 and a capacitor 100 connected between the output of the amplifier 98 and its negative input. The positive input of amplifier 98 is grounded. Accumulating memory 96 is similar to the well known Miller integrator and will increase or decrease a stored voltage level as the signal applied to it increases or decreases. A bilateral switch 102 is connected across the capacitor 100 between the output of the amplifier 98 and terminal 90. The control gate 103 of this switch is connected to reset terminal 76. When a reset signal is present, the switch 102 discharges the capacitor 100 to reset the accumulating memory to zero.

The output of the accumulating memory 96 is provided at terminal 104, and applied to analog sampler 52. Sampler 52 employs an accumulating memory similar to memory 96 including an operational amplifier 106 and a capacitor 108 connected between the amplifier's output and its negative input. The positive input to amplifier 106 is grounded. The demodulator output from terminal 104 is applied to the negative input of amplifier 106 via resistor 107, bilateral switch 110, and variable resistor 112. Resistor 113 is a feedback resistor. The ratio of resistors 113 and 107 controls the gain of amplifier 106 and conveniently may be 10 to 1. Variable resistor 112 controls the charging rate of capacitor 108. The sampler is initially zeroed by completely discharging capacitor 108 through a switch (not shown) like switch 110 when the analyzer is turned on or may be reset manually as required. The output from the sampler 52 is taken on terminal 114.

Returning to the delta demodulator, a weight signal is received as an input on terminal 116 which is connected to bilateral switch 80 by line 88. An inverted weight signal is provided to bilateral switch 82 on line 92. The weight signal is inverted by inverting amplifier 120. Inverting amplifier 120 has its positive input grounded and its negative input connected to the midpoint of resistors 118 and 122. Inverting amplifier 120 generates a nearly exact inverted copy of the weight signal applied to terminal 116. Thus, it is apparent that if bilateral switch 80 is operated a positive amplitude weight signal is provided to terminal 90 via line 88 and alternatively if bilateral switch 82 is operated a negative amplitude weight signal is provided to terminal 90 via line 92. A positive weight signal charges the accumulating memory 96 while a negative weight signal discharges the accumulating memory. Resistors 118 and 122 may be of the same resistance

DELTA DEMODULATOR OPERATION

Considering the operation of the demodulator 46, as the bit stream is fed to the flip-flop 70, a high output is provided to one of AND gates 72 and 74 depending upon whether the bit is 0 or 1. If the reset signal at terminal 76 is low, the AND gates are enabled and will produce outputs to control gates 84 and 86 depending on the polarity of the bit. In turn, this causes the weight signal applied at terminal 116 to charge or discharge the accumulating memory 96. After the bit stream for a complete EKG has been processed by the delta demodulator, bilateral switch 110 receives a signal on its control gate 111 causing sampler 52 to sample the voltage at terminal 104. Subsequently the demodulator is reset, the AND gates inhibited and the accumulating memory 96 cleared in preparation for the next EKG waveform.

Referring to FIG. 6, waveform 50, the output at terminal 104 of the demodulator is illustrated. As indicated by the dashed lines from "sample now" waveform 132, the ST level 130 is the voltage gated into the sampler 52. The depression can be displayed by a simple meter attached to sampler output terminal 114 having the PQ voltage level as a null point.

The sampler 52 takes one sample at the end of each EKG waveform when the accumulating memory 96 has the ST depression for that waveform stored on capacitor 100. After several heart beats the sampler memory, which is not reset for each EKG, contains an average value of the ST depression over a series of EKG waveforms. This insures an accurate determination of the ST depression level regardless of noise and other disturbances introduced. In particular, the dithering introduced in the modulating process is removed by the low pass filter function inherently provided by the demodulating and averaging process.

THEORETICAL BASIS FOR VARIABLE WEIGHT DEMODULATION

As thus far described, the delta demodulator 46 operates in a similar manner to other digital pulse code demodulators. However, as will now be explained, by utilizing a varying weight signal applied to terminal 116 of the demodulator the ST depression relative to the PQ segment is directly obtained without any requirement for comparing the levels. Beginning with the notation defined in equation (1) the difference of an average signal voltage over an interval, $b + 1$ to $b + m$, (the ST segment) and an average signal voltage over a preceding interval, $a + 1$ to $a + n$ (the PQ segment) is given by:

$$\frac{1}{m}\sum_{i=1}^{m} V_{b+i} - \frac{1}{n}\sum_{j=1}^{n} V_{a+j} \qquad (2)$$

Expanding and simplifying this expression yields:

$$\sum_{k=b+1}^{b+m+1}[\Delta \frac{b+m+1-k}{m}]e_k + \sum_{k=a+m+1}^{b}[\Delta]e_k + \sum_{k=a}^{a+m}[\Delta \frac{k-a}{n}]e_k \qquad (3)$$

In equation (3) for the bracketed quantities represent the weight signal size for a delta demodulator to generate the difference of the average signal voltage over two separate intervals. Equation (3) requires that the weight signal must rise linearly from an initial value during a first interval, remain constant until the second interval, and decrease linearly to the initial value during the second interval with a zero initial value.

Referring to FIG. 6, waveform 140, a waveform 140, a weight signal meeting the requirements of equation (3) is illustrated. It will be seen that during the PQ segment of the EKG waveform 33', the weight signal 140 rises linearly from zero to a maximum value. Between the PQ segment and the ST segment, the weight signal remains constant at the maximum value and finally decreases linearly back to zero over the ST segment. It is noted that the absolute value of the slopes of the increasing and decreasing portions of the weight signal need not be the same. By selecting appropriate slopes, the size of the PQ segment and ST segment included can be increased or decreased as desired. Such a selection would be determined by the specific EKG waveform being analyzed as a physician might require.

CONTROL AND WEIGHT SIGNAL GENERATOR

Figure 8:
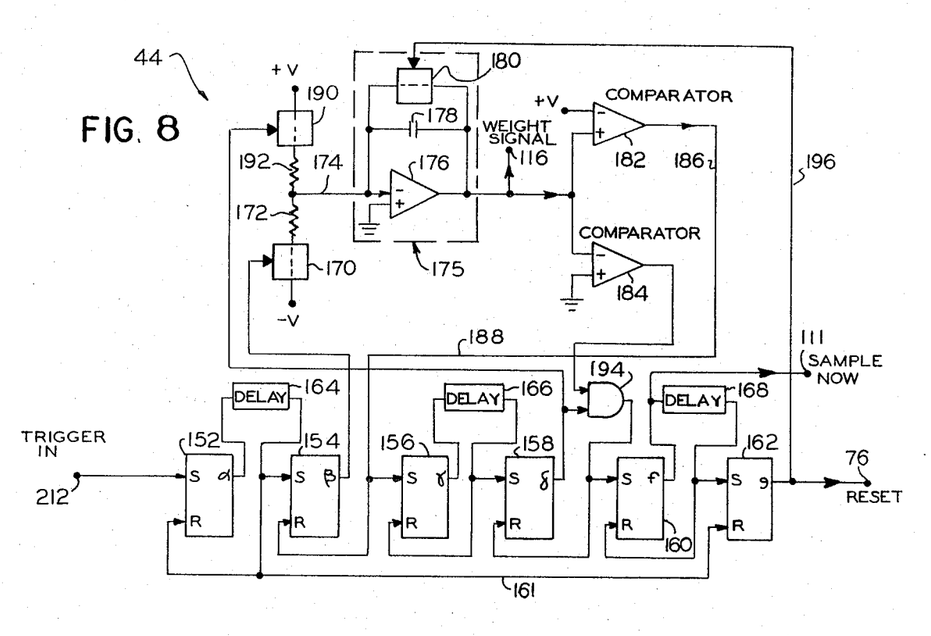
FIG. 8 is a schematic diagram of the control and weight signal generator.

Referring to FIG. 8, the circuit for generating the weight signal and control waveforms is disclosed. The control and weight signal generator 44 receives a trigger signal from trigger generator 42 and applied to the set input of an RS type flip-flop 152.

Flip-flop 152 is the first of a series of six RS flip-flops connected to form a sequential timing circuit as will be described. The remaining five flip-flops 154, 156, 158, 160 and 162 each produce the usual Q and $\bar{Q}$ outputs depending on the state of the input signal. To facilitate the description and understanding of the present circuit, however, the $\bar{Q}$ outputs have been omitted and the Q outputs have been designated with the lower case letters alpha, beta, gamma, delta, f and g respectively to directly correlate with the waveforms illustrated in FIG. 9.

The output, alpha, of flip-flop 152 is connected via a delay 164 to the set input of flip-flop 154. Similarly, the output gamma of flip-flop 156 is connected to the set input of flip-flop 158 via a delay 166, and the output, f, of flip-flop 160 is connected via delay 168 to the set input of flip-flop 162. Connected to the set inputs of flip-flops 154, 156, 158, 160 and 162 are lines connected to the reset inputs of the previous stage flip-flop. Thus, as is apparent, when flip-flop 154 is set, flip-flop 152 is reset. Similarly, when flip-flops 156, 158, 160 and 162 are set, flip-flops 154, 156, 158, and 160 are reset. Flip-flop 162 is reset when flip-flop 154 is set via line 161.

Referring to flip-flop 154, its output, beta, is connected to the control gate of a bilateral switch 170. One terminal of the switch 170 is connected to a source of negative voltage while the other terminal is connected via resistor 172 to line 174. Line 174 is connected to the negative input of amplifier 176 while the positive input of the amplifier is grounded. Connected in parallel from the output of amplifier 176 to its negative input is a capacitor 178 and a bilateral switch 180. Operational amplifier 176 and capacitor 178 form an integrator 175. Bilateral switch 180 is utilized to reset the integrator to zero. The output of integrator 175 is the weight signal applied to terminal 116 of the delta demodulator.

Additionally, the integrator output is supplied to a pair of comparators 182 and 184. Comparator 182 receives the integrator output at its positive input, its negative input being connected to a source of positive voltage. Comparator 184 receives the integrator output at its negative input, its positive input being grounded. The output of comparator 182 is connected via line 186 to the set input of flip-flop 156.

When the beta signal from flip-flop 154 initiates operation of the integrator 175, the integrator begins to charge up producing a linearly increasing weight signal until the comparator 182 detects that the weight signal equals the voltage +V at its negative input. At that point, flip-flop 156 is set via line 186 and flip-flop 154 is reset. This causes integrator 175 to stop. The weight signal remains constant at the value reached when the integrator was stopped.

Setting flip-flop 156 causes flip-flop 158 to be set after a delay period provided by delay 166. The output, delta, of flip-flop 158 is connected via line 188 to the control gate of bilateral switch 190. One terminal of the bilateral switch 190 is connected to a positive source of voltage and the other terminal is connected by a resistor 192 to the negative input of amplifier 176. Operating bilateral switch 190 causes the integrator 175 which has run up and stopped to run down to its initial value. This produces the linearly decreasing weight signal required by the delta demodulator for the ST segment.

When the integrator 175 has run down to zero, comparator 184 will detect this condition and provide a signal on line 193 to AND gate 194. The other input to AND gate 194 is the delta output of flip-flop 158. Thus, when the integrator reaches zero AND gate 194 produces a signal setting flip-flop 160, and resetting flip-flop 158. Setting flip-flop 160 produces an output, $f$, which is the "sample now" signal for sampler 54. The f output, via delay 168 also sets flip-flop 162.

The output, $g$, of flip-flop 162 is fed via line 196 to the control gate of bilateral switch 180 which resets the integrator 175 to ensure it remains at zero until the next beta signal. Additionally, the output g is provided to terminal 76 of the delta demodulator for zeroing the accumulating memory 96 and inhibiting operation of the AND gates 72 and 74. The g output of flip-flop 162 remains high until another trigger signal is received initiating the next sequence.

OPERATION OF THE CONTROL AND WEIGHT SIGNAL GENERATOR

Figure 9:
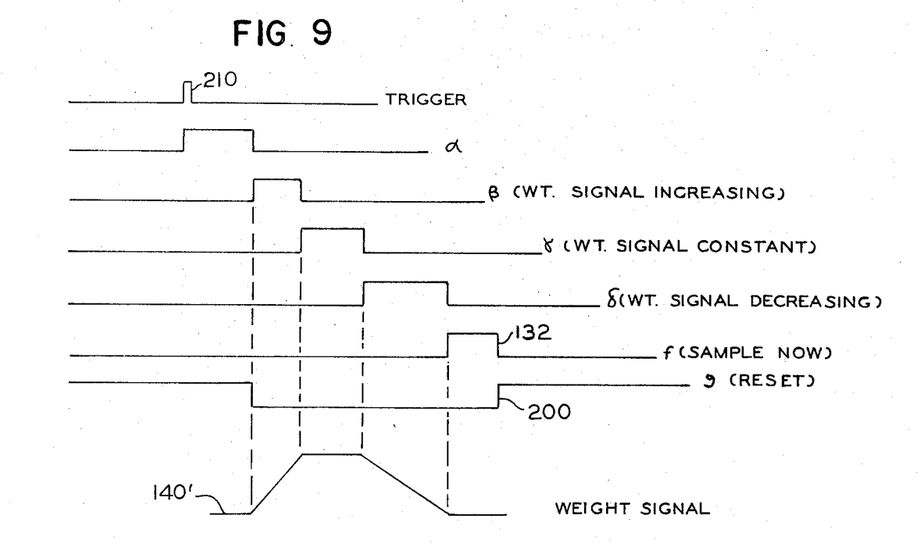
FIG. 9 are waveforms useful in understanding the operation of the circuit of FIG. 8.

Referring to FIGS. 8 and 9, the operation of the control and weight signal generator may be readily explained. When a trigger pulse 210 from trigger generator 42 is received on terminal 212 it is effective to set flip-flop 152 initiating operation of the control and weight signal generator. Setting flip-flop 152 produces the output alpha, shown in FIG. 9, which, after a delay sets flip-flop 154 and resets flip-flops 152 and 162. The output beta, of flip-flop 154 causes the bilateral switch 170 to close causing the integrator 175 to begin charging up. The integrator output is linear due to the constant current applied to its input through resistor 172 from constant voltage source -V. When the output of integrator 175 exceeds the value +V, comparator 182 produces an output on line 186 effective to set flip-flop 156 and reset flip-flop 154, thereby stopping the integrator 175. The flip-flop 156 output, gamma, after a delay 166, sets flip-flop 158 and resets flip-flop 156. During the time that gamma is high (FIG. 9) the output of the integrator 175 remains constant.

Setting flip-flop 158 causes its output, delta, to operate bilateral switch 190. This causes the integrator output to decrease from the value reached during the beta interval and maintained constant during the gamma interval. Again, since the input to the integrator is a constant current flowing through resistor 192 from constant voltage source +V, the integrator output linearly decreases. When the output of the integrator reaches its initial value (zero), comparator 184 will produce a positive output effective to operate AND gate 194. The output of AND gate 194 sets flip-flop 160 and resets flip-flop 158.

As explained, the generator 44 has at this point produced a weight signal precisely as required by the delta demodulator to directly yield the average voltage of the ST segment minus the average voltage of the PQ segment. The balance of the generator 44 circuitry is for sampling and reset purposes.

Setting flip-flop 160 produces the output f utilized by the analog sampler 52 to gate the output of the delta demodulator into the samples memory. This signal after a delay also sets flip-flop 162 thereby resetting flip-flop 160. Setting flip-flop 162 produces the g output which is the system reset signal.

TRIGGER GENERATOR

Figure 7:
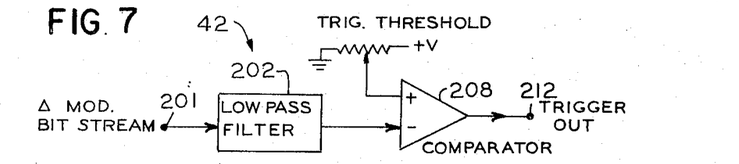
FIG. 7 is a schematic diagram of the trigger circuit.

Referring now to FIG. 7, a circuit diagram of the trigger generator 42 is shown. The trigger generator receives the delta modulated bit stream as its input at terminal 201. The bit stream is passed through a low-pass filter 202, which generates a rate of change waveform 204 illustrated in FIG. 6. The sharp peak, 206, in waveform 204 corresponds to the steep negative slope between points R and S on the EKG waveform 33. This waveform 204 is provided to the negative input of an operational amplifier 208, the positive input of which is connected to an adjustable trigger threshold comprising a resistor connected between a positive source of voltage and ground. By suitably choosing the trigger threshold reliable triggering can be obtained on the R wave negative slope without inadvertent triggering by other waves of the EKG.

When the waveform 204 exceeds the trigger threshold D.C. reference voltage, comparator 208 clips the peak portion 206 of such waveform and transmits such peak as a trigger output pulse which, as illustrated in FIG. 6 is of a more rectangular shape than peak 206 because the comparator amplifier saturates. This trigger pulse is applied to terminal 212 of the control and weight signal generator 44.

DISPLAY AND FURTHER PROCESSING

Referring again to FIG. 3, block 54 represents the various means by which the ST depression obtained by the present invention may be utilized. As previously mentioned, the ST depression can be directly displayed on a simple volt meter which has the average PQ level as its null point. Various other means of utilizing the information are clearly within the contemplation of the present system as, for example, providing the depression level to a computer for data correlation, gating the information into a monitoring system for use with a hospitalized patient and many other applications.

SYSTEM OPERATION

While it is believed that the operation of the present invention is apparent from the foregoing description, for the sake of convenience a brief summary of the system operation will now be provided.

Referring to FIG. 3, an input EKG waveform received from electrodes located on a patient's body is preamplified and fed into a delta demodulator 34. Prior to delta modulation, the EKG waveform has a high frequency component of noise added to it by the dither generator 36. The dithered EKG is then delta modulated to produce a binary bit stream representation 38.

The delta modulator produces the bit stream by comparing the instantaneous value of the EKG waveform against a stored reference obtained from previous comparisons. If the instant sample is greater than the stored value, a 1 is generated. If the comparison determines that the EKG is less than the reference value, a zero is generated. Conceptually this is analogous to transmitting the algebraic sign or polarity of the comparison.

The binary bit stream 38 generated by the delta modulator is fed through a digital delay 40 to provide the delayed bit stream 38' which is applied to the variable weight delta demodulator 36. The bit stream is also provided to the trigger generator 42 which produces trigger pulse 210 for initiating operation of the control and weight signal generator 44. Generator 44 produces the weight signal waveform 140 as shown in FIG. 6 during the appropriate segments of the waveform 33'.

By varying the weight signal in the manner described, the delta demodulator directly produces the difference between the average ST voltage level and the average PQ voltage level. Control and weight signal generator 44 also produces the reset and "sample now" signals. The analog sampler gated by the "sample now" waveform stores and averages the ST depression obtained over several EKG waveforms to increase the accuracy of the measurement.

The above specification has disclosed a delta demodulator for use in determining ST depressions of an EKG. It will be recognized, however, that the novel variable weight delta demodulator has utility in other applications. By altering the weight signall to accommodate other waveforms of interest it is easily within the ability of one skilled in the art to obtain the sum or difference of two waveform segments of interest. Accordingly, while I have shown a preferred embodiment it will be obvious to those having skill in the art that many changes may be made in the above-described details without departing from the spirit of the invention. Therefore, the scope of the present invention should only be determined by the following claims.

I claim:

1. A method for determining the average ST segment depression of an electrocardiogram (EKG) waveform relative to the PQ segment of the same EKG waveform comprising the steps of:
    a. delta modulating said EKG waveform to produce a digital representation thereof;
    b. delaying said digital representation;
    c. delta demodulating the digital representation to directly yield said average ST depression; said delay being sufficient to allow the R portion of said EKG waveform to initiate operation of said demodulating step.

2. A method in accordance with claim 1 including the additional steps of:
    a. sampling a plurality of said average ST depressions corresponding to a plurality of EKG waveforms,
    b. displaying the average value of the samples.

3. A method in accordance with claim 1 further including the step of:

a. adding a high frequency dither signal to the EKG waveform prior to delta modulating it to improve the amplitude resolution of the delta modulation.

4. A method in accordance with claim 1 wherein said step of delta modulating includes the substeps of:

a. comparing the instantaneous value of said EKG waveform with a stored voltage level to produce a difference output, and b. adjusting said stored voltage level in accordance with the difference output of said comparison.

5. The method of claim 1 wherein said delaying step provides a fixed delay for the digital representation.

6. The method in accordance with claim 1 wherein the step of demodulating includes the substeps of:

generating a weight signal whose amplitude varies such that it linearly increases from an initial value to a maximum value during the digital representation of the PQ segment, remains constant at said maximum value during the period between the digital representation of the PQ and ST segments, and linearly decreases from said maximum value to said initial value during the digital representation of the ST segment; and utilizing the delayed digital representation to gate said weight signal into an accumulating memory.

7. The method in accordance with claim 6 wherein the said weight signal is added to or substracted from said memory according to the polarity of each digital bit of the digital representation gating it.

8. An EKG analyzer for determining the average ST segment depression of an electrocardiogram (EKG) waveform relative to the PQ segment of the same EKG waveform comprising:

a. modulator means for delta modulating said EKG to produce a digital representation thereof, b. delay means for delaying said digital representation, c. demodulator means for delta demodulating said digital representation to directly yield said average ST depression; said delay being sufficient to allow the R portion of said EKG waveform to initiate operation of said demodulating means.

9. The analyzer of claim 8 further including:

sampling means for sampling a plurality of said average ST depressions corresponding to a plurality of EKGs, and means for displaying the average value of the samples.

10. The analyzer of claim 8 further including dither means for adding a dither signal to said EKG waveform prior to modulating it to improve the amplitude resolution of said delta modulation means.

11. The analyzer according to claim 8 wherein said delta modulation means includes:

a. comparator means for repetitively comparing the instantaneous value of said EKG waveform with a stored reference voltage to produce a difference output, and b. means for adjusting said reference voltage after each comparison in accordance with said difference output.

12. The analyzer according to claim 8 wherein said delay means is a fixed length shift register.

13. The analyzer of claim 8 wherein said demodulation means includes:

a. an accumulating memory, b. weight signal generator means for generating a varying weight signal, and c. means for applying said weight signal to said memory.

14. The analyzer according to claim 13 further including means for zeroing said memory prior to each EKG waveform and wherein said means for applying said weight signal are gated by said digital representation.

15. The analyzer according to claim 14 wherein said means for applying said weight signal are a pair of switches, one of said pair being operated if a digital bit is 1 causing said weight signal to be added to said memory;

the other of said pair being operated if a digital bit is 0 causing said weight signal to be subtracted from said memory.

16. The analyzer according to claim 14 wherein said weight signal is added to or subtracted from said memory according to the polarity of each digital bit of said digital representation.

17. The analyzer according to claim 13 wherein said weight signal generating means produces a weight signal whose amplitude linearly increases from an initial value to a maximum value during the digital representation of the PQ segment, remains constant at said maximum value between the digital representation of the PQ and ST segments, and linearly decreases from said maximum value to said initial value during the digital representation of the ST segment.

18. The analyzer according to claim 17 wherein said weight signal generator means includes:

linear integrator means for integrating D.C. signals, switching means for connecting the input of said integrating means to D.C. voltage sources of opposite polarity, and sequential circuit means for operating said switching means to produce said weight signal output.

19. The analyzer according to claim 18 wherein said weight signal generator means further includes comparator means for detecting the output of said integrator means to control the sequencing of said sequential circuit means.

20. The analyzer according to claim 18 wherein said weight signal generator means further includes:

means for resetting itself and said delta demodulation means, and means for gating said sampling means when said accumulating memory contains said ST depression.

* * * * *